United States Patent [19]

Bahr

[11] Patent Number: 5,960,927
[45] Date of Patent: Oct. 5, 1999

[54] APPARATUS FOR PROVIDING A BUFFER BETWEEN ARTICLE-HANDLING DEVICES

[75] Inventor: Mel J. Bahr, Corcoran, Minn.

[73] Assignee: MGS Machine Corporation, Maple Grove, Minn.

[21] Appl. No.: 08/846,371

[22] Filed: Apr. 30, 1997

[51] Int. Cl.[6] ........................................ B65G 1/00
[52] U.S. Cl. ........................ 198/347.1; 198/812
[58] Field of Search ............................ 198/347.1, 347.3, 198/430, 812

[56] References Cited

U.S. PATENT DOCUMENTS

| | | | |
|---|---|---|---|
| 2,932,376 | 4/1960 | Millington | 198/812 X |
| 3,429,466 | 2/1969 | Puderbach . | |
| 3,817,405 | 6/1974 | Neely, Jr. . | |
| 3,954,165 | 5/1976 | Snyder . | |
| 3,995,748 | 12/1976 | Looney . | |
| 4,142,626 | 3/1979 | Bradley . | |
| 4,164,997 | 8/1979 | Mueller . | |
| 4,168,776 | 9/1979 | Hoeboer . | |
| 4,180,154 | 12/1979 | Andersson . | |
| 4,231,470 | 11/1980 | Griswold . | |
| 4,325,475 | 4/1982 | Spalding . | |
| 4,394,899 | 7/1983 | Pratt et al. . | |
| 4,399,905 | 8/1983 | Lance et al. . | |
| 4,513,858 | 4/1985 | Fellner et al. . | |
| 4,523,671 | 6/1985 | Campbell . | |
| 4,618,055 | 10/1986 | Porcelli . | |
| 4,768,642 | 9/1988 | Hunter et al. . | |
| 4,802,570 | 2/1989 | Hirsch et al. . | |
| 4,835,947 | 6/1989 | Langen et al. . | |
| 5,018,334 | 5/1991 | Guttinger et al. . | |
| 5,191,963 | 3/1993 | Delsanto . | |
| 5,261,522 | 11/1993 | Guttinger et al. . | |
| 5,314,054 | 5/1994 | Van Laar | 198/347.1 |
| 5,460,258 | 10/1995 | Tisma . | |
| 5,611,418 | 3/1997 | Helmstetter | 198/347.1 |

Primary Examiner—James R. Bidwell
Attorney, Agent, or Firm—Merchant, Gould, Smith, Edell, Welter & Schmidt, P.A.

[57] ABSTRACT

The present invention relates to an accumulating device for providing a buffer. The accumulating device includes a frame and a guide structure reciprocally movable in opposite first and second directions with respect to the frame. A continuous chain configured for conveying pieces of product is mounted on the guide structure. The accumulating device also includes a plurality of driven gears constructed and arranged to both rotate the chain about the guide structure and reciprocate the guide structure in the first and second directions relative to the frame. A buffer is generated when the guide structure is moved in the first direction. The buffer is cleared when the guide structure is moved in the second direction.

24 Claims, 9 Drawing Sheets

APPARATUS FOR PROVIDING A BUFFER BETWEEN ARTICLE-HANDLING DEVICES

FIELD OF THE INVENTION

The present invention relates generally to devices or apparatuses for handling products to be packaged. More specifically, the present invention relates to apparatuses for providing buffers between article-handling devices.

BACKGROUND OF THE INVENTION

The packaging industry utilizes a variety of devices for handling, processing, and packaging products. In packaging a particular product, it is common for products to be fed from a first handling machine to a second handling machine. At times, the feed rate of the first handling machine may exceed the feed rate of the second handling machine. Additionally, the first handling machine may have an irregular feed rate. To accommodate the above situations, it is common to place a buffering apparatus between the first and second machines. The buffering apparatus is equipped to accumulate products for short periods of time and to feed products to the second machine at a controlled rate.

There currently is a need for a buffering device that is reliable and relatively inexpensive to manufacture. There is also a need for a buffering device capable of handling products that are not uniform in shape or consistency. There is further a need for a buffering device that includes means for rejecting products from a products line should equipment downstream from the buffering device fail to operate. Furthermore, what is needed is a buffering device that occupies a minimal amount of floor space. Moreover, what is needed is a dependable buffering device having stacking capabilities. Additionally, what is needed is a buffering device that can be powered by any number of different drive mechanisms such as clutch and brake motors, stepper motors, and servo motors. The present invention addresses these needs as well as other needs.

SUMMARY OF THE INVENTION

One aspect of the present invention relates an accumulating device for providing a buffer between two product-handling devices. The accumulating device includes a frame and a guide structure that is reciprocally movable in opposite first and second directions relative to the frame. The accumulating device also includes a continuous chain mounted on the guide structure. The continuous chain is adapted for conveying pieces of product between the two article-handling devices. The accumulating device further includes a plurality of driven gears for driving the chain about the guide structure. The gears are constructed and arranged to reciprocate the guide structure relative to the frame by controlling the movement of selected portions of the chain relative to the guide structure. In this manner, the gears function to both rotate the chain about the guide structure and to reciprocate the guide structure in the first and second directions relative to the frame. A buffer is generated when the guide structure is moved in the first direction. The buffer is cleared when the guide structure is moved in the second direction. The above-described configuration allows drive mechanisms of a varying complexity, precision, and expense, such as clutch and brake motors, stepper motors, and servo motors, to be used to power the gears.

Another aspect of the present invention relates to an accumulating device having a frame and a guide structure supported by the frame. The entire guide structure is constructed and arranged to reciprocate in opposite first and second translational directions relative to the frame. A continuous drive chain is mounted on the guide structure. A first drive gear mechanism is fixedly mounted relative to the frame and arranged and configured to propel the chain clockwise about the guide structure by driving the chain in the first translational direction. A second drive gear mechanism is fixedly mounted relative to the frame and arranged and configured to propel the chain clockwise about the guide structure by driving the chain in the second translational direction. The accumulating device also includes control structure for controlling the first and second drive gear mechanisms such that the first and second drive gear mechanisms cooperate to selectively translate the guide structure in the first and second translational directions. When the guide structure is translated in the first translational direction, a buffer is generated such that the accumulating device is adapted to accumulate pieces of product. By contrast, when the guide structure is translated in the second translational direction, the accumulating device is adapted to clear at least some of the pieces of product from the buffer.

A further aspect of the present invention relates to an accumulating device including a frame and a continuous driven member adapted for conveying pieces of product. The device also includes a guide structure supported by the frame. The guide structure is constructed and arranged to reciprocate in opposite first and second translational directions relative to the frame. The guide structure also defines a pathway about which the continuous driven member is guided. The pathway has a geometry that remains substantially constant as the guide structure is reciprocated. The accumulating device further includes a drive assembly constructed and arranged to drive the driven member about the pathway and to translate the guide structure in the first and second directions. A buffer for accumulating pieces of product is generated when the guide structure is moved in the first translational direction. By contrast, the buffer is adapted to be cleared when the guide structure is moved in the second translational direction.

Any of the above-described accumulating devices can include guide structures having plastic guide tracks. Such a configuration helps reduce manufacturing costs and improves operating efficiency. Additionally, any of the above-described accumulating devices can include guide structures that are reciprocated upward and downward in a substantially vertical orientation so as to minimize the floor space occupied by such accumulating devices.

A further aspect of the present invention relates to an accumulating device having a continuous chain including a plurality of paddles configured for conveying products. The accumulating device also includes at least two spaced-apart gears configured for driving the chain. The gears are relatively phased such that the chain is loosened in the region between the gears. The accumulating device also includes a bump structure for forcing the loosened chain outward, thereby causing the paddles of the chain to spread apart to facilitate feeding products between the paddles. By spreading the paddles apart, the paddles are configured for readily receiving inconsistently shaped products.

One further aspect of the present invention relates to an accumulating device including a continuous chain having a plurality of paddles for conveying products. The continuous chain is driven by at least two spaced-apart gears. The gears are relatively phased to tighten the chain in the region between the gears. By tightening the chain, the paddles are precisely maintained at predetermined orientations relative to one another. Such a feature is advantageous when utilized at an output station. By maintaining precise spacing between the paddles, output equipment can be used to remove products from between the paddles with a reduced likelihood that such output equipment may engage, jam, or otherwise interfere with the buffering device.

A variety of additional advantages of the invention will be set forth in part in the description which follows, and in part will be apparent from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Reference will now be made in detail to the exemplary aspects of the present invention which are illustrated in the accompanying drawings. Wherever possible, the same reference numbers will be used throughout the drawings to refer to the same or like parts.

Figure 1A:
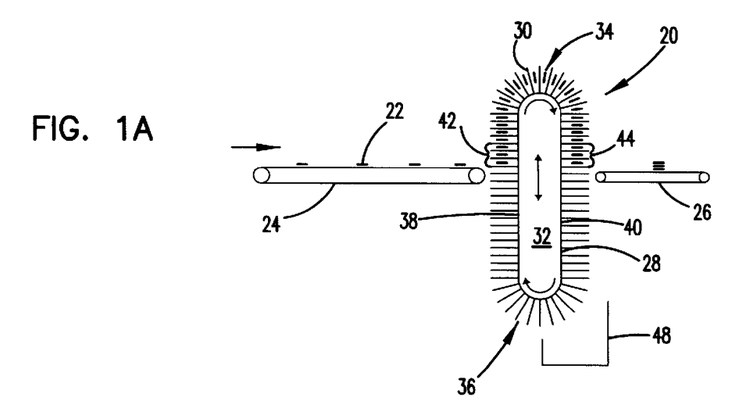
FIG. 1A is a schematic diagram illustrating an accumulating device constructed in accordance with the principles of the present invention, the accumulating device is shown with the buffer substantially empty.
Figure 1B:
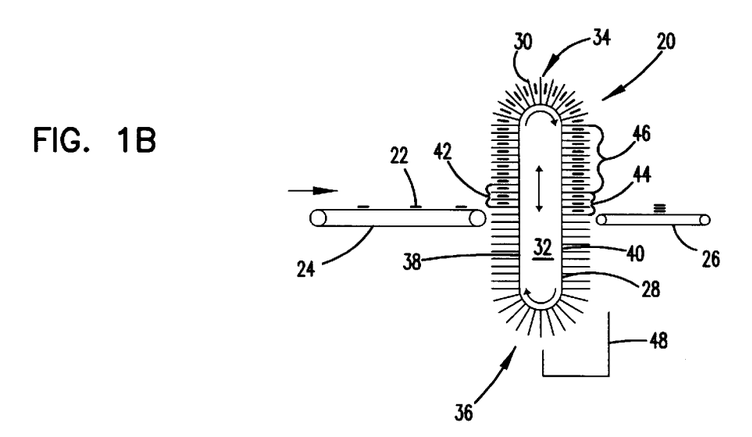
FIG. 1B is a schematic illustration of the accumulating device of FIG. 1A with the buffer partially full.
Figure 1C:
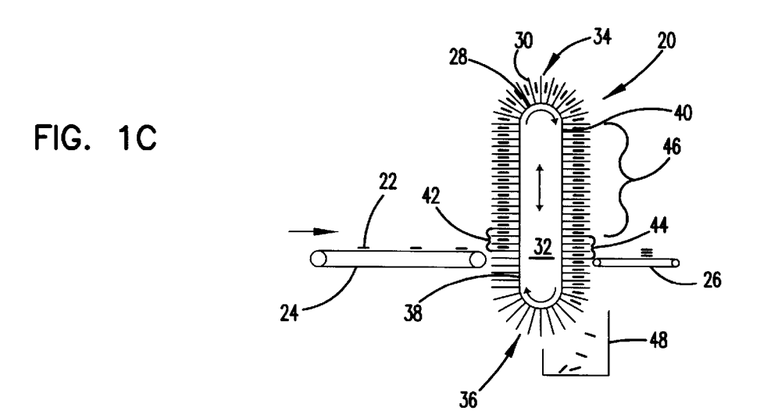
FIG. 1C is a further schematic illustration of the accumulating device of FIG. 1A with the buffer almost completely full.

FIGS. 1A–1C illustrate an accumulating device 20 constructed in accordance with the principles of the present invention. The accumulating device 20 is configured to convey pieces of product 22 from an infeed mechanism 24, shown as a conveyor, to an outfeed mechanism 26, also shown as a conveyor. Generally, the accumulating device 20 generates a buffer by translating upward and clears the buffer by translating downward. The accumulating device 20 also functions as a stacker for stacking the pieces of product 22 in stacks having a designated height. For example, as shown in FIGS. 1A–1C, the pieces of product 22 are individually fed into the accumulating device 20 and are removed from the accumulating device 20 in stacks of three. Typically, a pusher is used to remove the stacks of product 22 from the accumulating device 20. The pusher typically has a predetermined number of pusher arms that correspond to the number of products 22 desired to be stacked. For example, if three products 22 are desired to be stacked, the pusher would include three arms or prongs that concurrently push a stack of three products from the accumulating device 20 to the outfeed mechanism 26. The number of arms or prongs can be varied to vary the height of the product stack. Additionally, if desired, the product 22 can be individually removed from the accumulating device 20.

The accumulating device 20 includes a continuous-driven member 28 including a plurality of spaced-apart paddles 30 configured for conveying the pieces of product 22 from the infeed mechanism 24 to the outfeed mechanism 26. The accumulating device 20 also includes a guide structure 32 on which the continuous-driven member 28 is mounted. The guide structure 32 defines a path about which the continuous-driven member 28 is propelled. As shown in FIGS. 1A–C, the driven member 28 is propelled in a clockwise direction about the guide structure 32. The path defined by the guide structure 32 has a geometry that remains substantially constant as the guide structure 32 is reciprocated up and down. As shown in FIGS. 1A–1C, the geometry of the path defined by the guide structure 32 is generally oblong or oval shaped.

In more specific terms, the path defined by the guide structure 32 includes top and bottom arcuate ends 34 and 36 and opposing first and second substantially parallel portions 38 and 40 extending between the arcuate ends 34 and 36. The continuous-driven member 28 is looped around the arcuate ends 34 and 36 and extends along the first and second substantially parallel portions 38 and 40.

In normal operation, the infeed mechanism 24 feeds the products 22 between the paddles 30 of the accumulating device 20 at an input region 42. The continuous-driven member 28 carries the pieces of inputted product 22 around the top arcuate end 34 of the guide structure 32 toward an output region 44. At the output region 44, the pieces of product 22 are transferred either individually or in stacks to the outfeed mechanism 26. If the input rate of the infeed mechanism 24 exceeds the output rate of the outfeed mechanism 26, the guide structure 32 is translated upward such that a buffer region 46 (shown in FIG. 1B) is generated. If the input rate of the infeed mechanism 24 continues to exceed the output rate of the outfeed mechanism 26 after the buffer has been filled, the products 22 held by the accumulating device 20 overflow into an overflow bin 48 (as shown in FIG. 1C). If the output capacity of the outfeed mechanism 26 exceeds the infeed rate of the input mechanism 24, the buffer region 46 can be cleared by translating the accumulating device 20 in a downward direction.

Figure 2A:
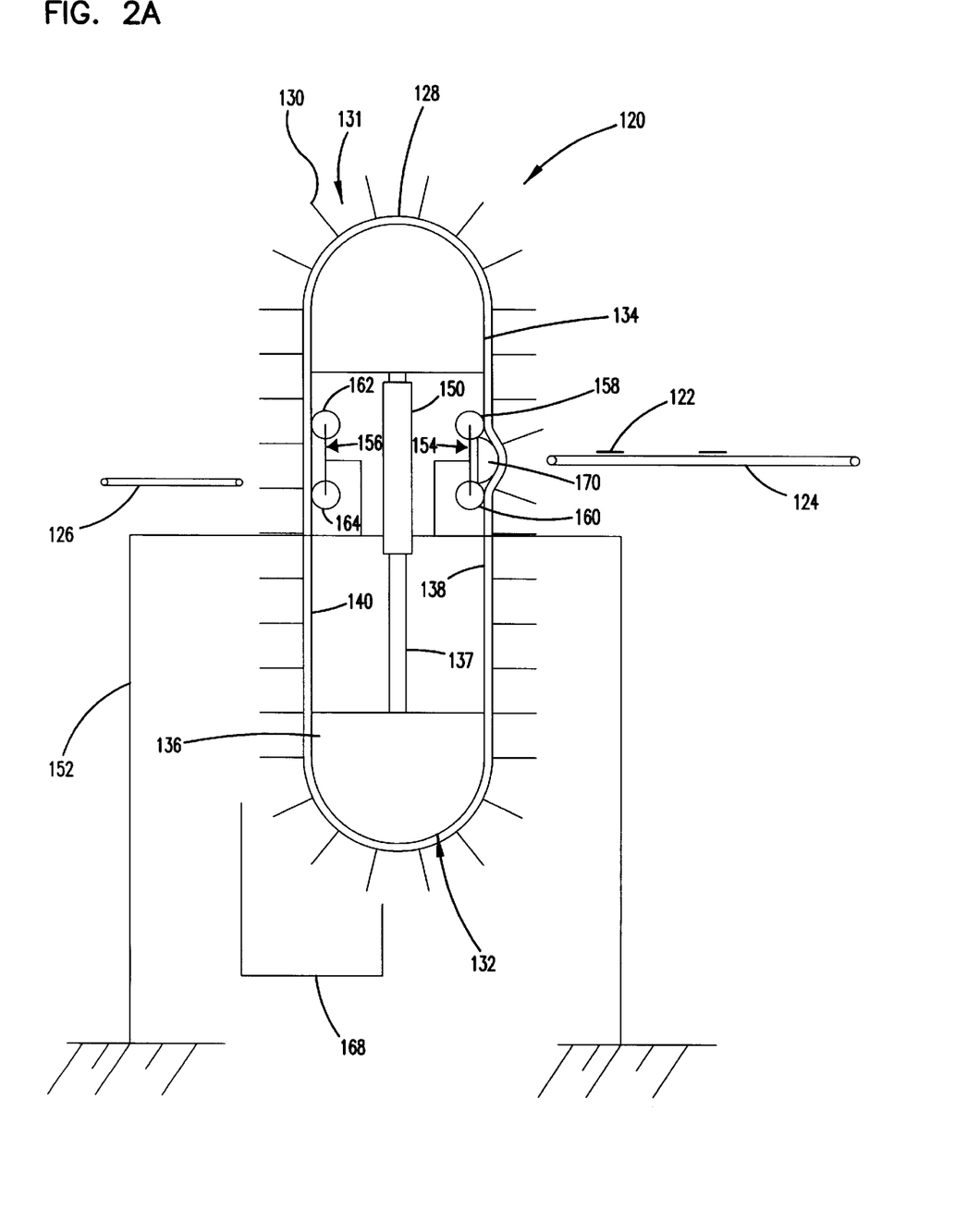
FIG. 2A is a schematic illustration showing an accumulating device constructed in accordance with the principles of the present invention, the buffer of the accumulating device is substantially empty.
Figure 2B:
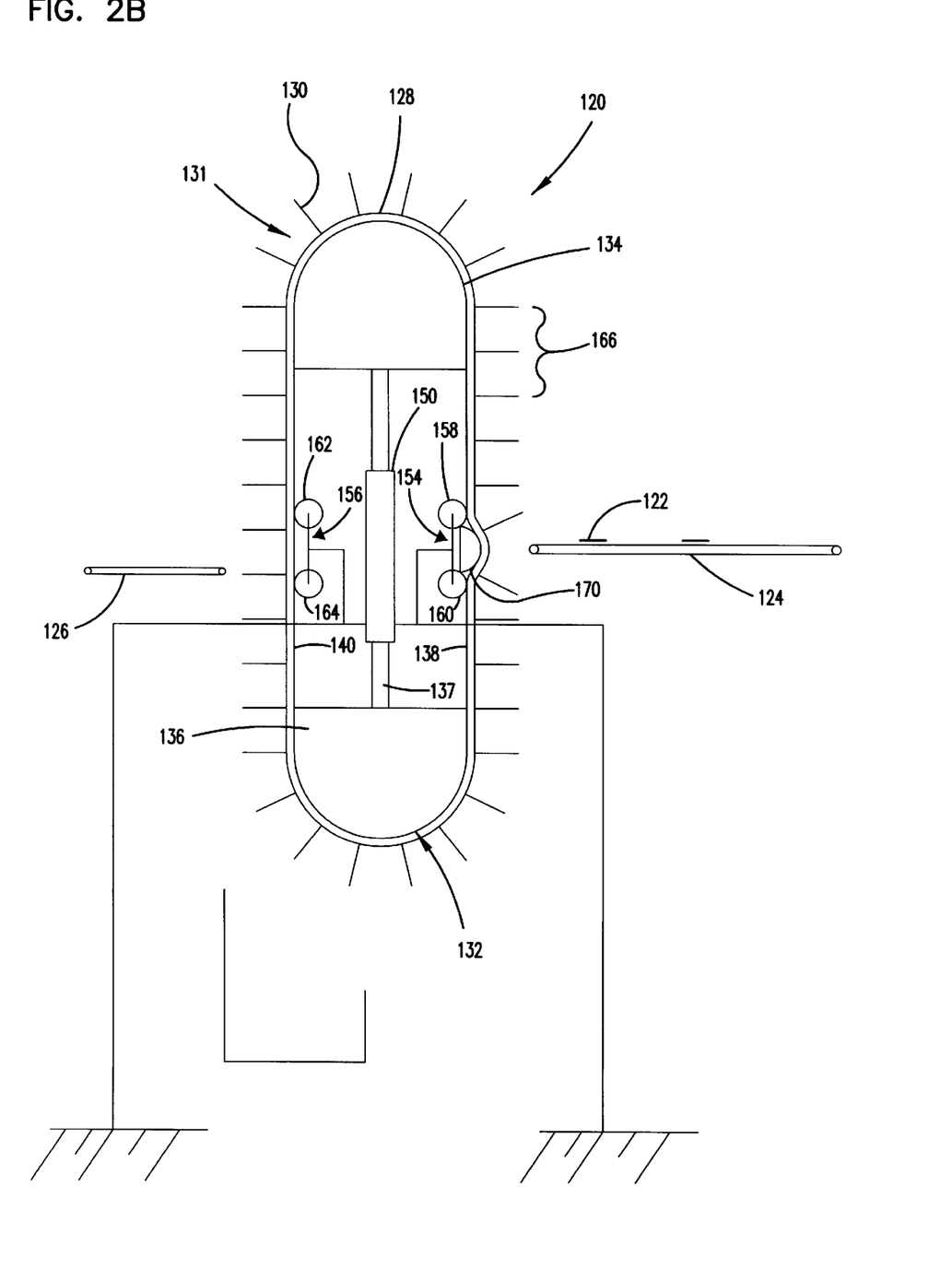
FIG. 2B is a schematic illustration of the accumulating device of FIG. 2A with the buffer partially filled.
Figure 2C:
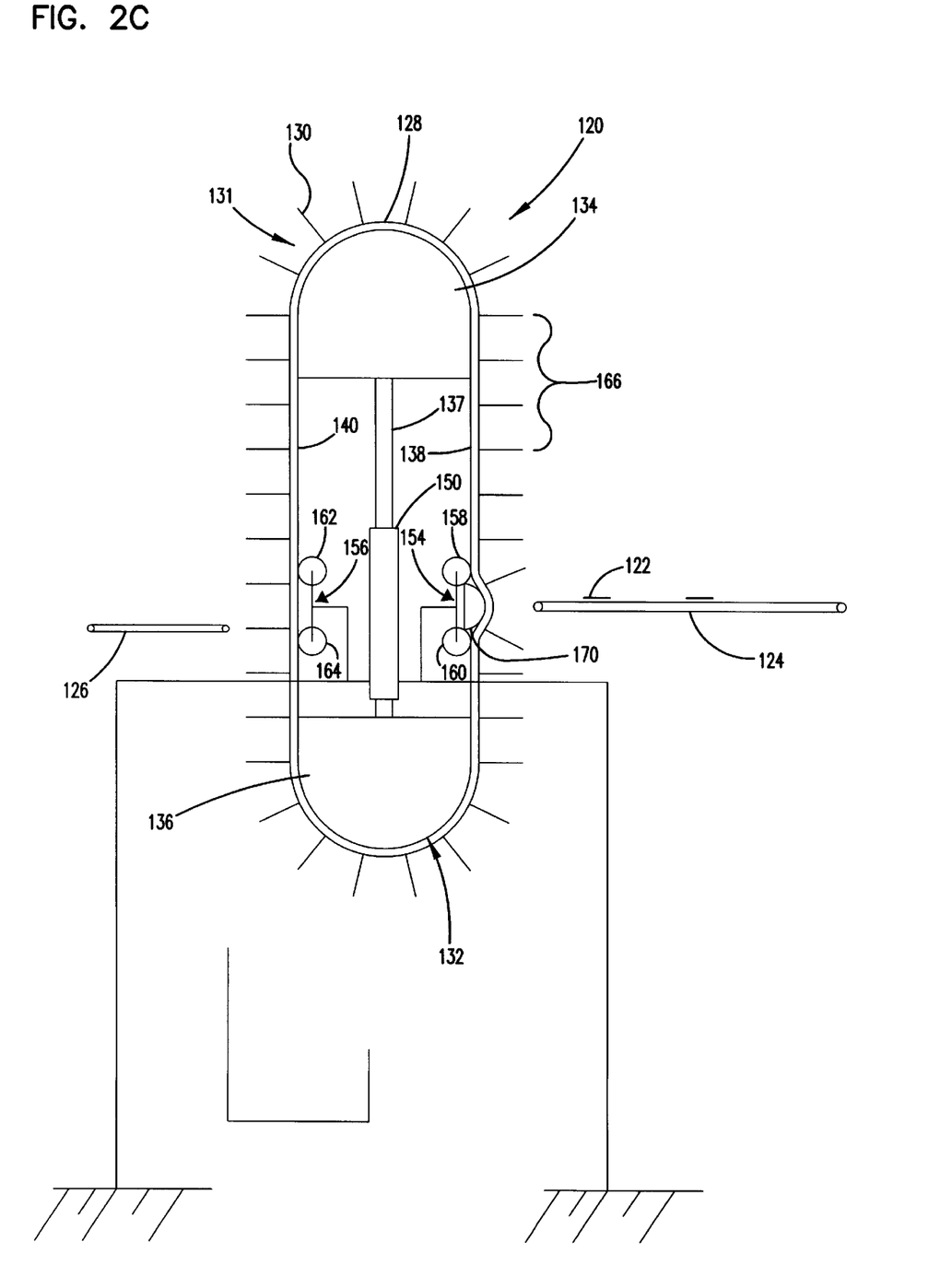
FIG. 2C is a further schematic illustration of the accumulating device of FIG. 2A with the buffer almost completely full.

FIGS. 2A–2C illustrate an accumulating device 120 configured for conveying product 122 between an input mechanism 124 and an output mechanism 126. The accumulating device 120 includes a continuous chain 128. A plurality of paddles 130 are mounted on the continuous chain 128. The paddles 130 project outward from the continuous chain 128 and define pockets 131 configured for receiving the product 122. The paddles 130 allow the continuous chain 128 to effectively convey the product 122 from the input mechanism 124 to the output mechanism 126.

The accumulating device 120 also includes a guide structure 132 on which the continuous chain 128 is mounted. The guide structure 132 includes arcuate top and bottom end pieces 134 and 136. A connecting member 137 extends between and maintains a fixed spacing between the top and bottom arcuate end pieces 134 and 136. The connecting member 137 and the end pieces 134 and 136 cooperate to define a chain path having a fixed geometry. As shown in FIGS. 2A–2C, the geometry of the chain path is substantially oblong.

The continuous chain 128 is looped over the top and bottom arcuate end pieces 134 and 136 of the guide structure 132. Preferably, the end pieces 134 and 136 are made of a plastic material and include tracks, grooves, slots, or other similar type structure for guiding the chain 128 around the ends of the accumulating device 120. In the region between the top and bottom arcuate end pieces 134 and 136, the chain 128 forms first and second substantially parallel portions 138 and 140. The substantially parallel portions 138 and 140 are generally vertically aligned and are substantially parallel to the connecting member 137.

The connecting member 137 of the guide structure 132 is slidably mounted within a linear bearing structure 150. The linear bearing structure 150 is connected to a frame 152 that fixes the linear bearing structure 150 relative to the input and output mechanisms 124 and 126. The liner bearing structure 150 allows the guide structure 132 to reciprocate upward and downward relative to the input and output mechanisms 124 and 126. Interference between the liner bearing structure 150 and the top and bottom end pieces 134 and 136 limits the range of vertical motion of the guide structure 132.

The accumulating device 120 also includes a drive assembly constructed and arranged to drive the continuous chain 128 around the path defined by the guide structure 132. As shown in FIGS. 2A–2C, the drive assembly propels the continuous chain 128 in a counterclockwise direction around the guide structure 132. The drive assembly is also constructed and arranged to reciprocate the guide structure 132 relative to the frame 152 by controlling the movement of selected portions of the chain 128 relative to the guide structure 132.

In more specific terms, the drive assembly includes an input gear mechanism 154 that engages the first substantially parallel portion 138 of the chain 128, and an output gear mechanism 156 that engages the second substantially parallel portion 140 of the chain 128. The input and output gear mechanisms 154 and 156 are fixedly connected to the frame 152. The input gear mechanism 154 includes first and second input gears 158 and 160 that propel the first substantially parallel portion 138 of the chain 128 in a upward direction. The output gear mechanism 156 includes first and second output gears 162 and 164 that propel the second substantially portion 140 of the chain 128 in a downward direction. When the input gear mechanism 154 propels the first substantially parallel portion 138 of the chain 128 upward at a rate that exceeds the rate at which the output gear mechanism 156 propels the second substantially parallel portion 140 of the chain 128 downward, the guide structure 132 is caused to translate or slide upward relative to the linear bearing structure 150 such that a buffer is generated. By contrast, when the output gear mechanism 156 drives the second substantially parallel portion 138 of the chain 128 downward at a rate that exceeds the rate in which the input gear mechanism 154 drives the first substantially parallel portion 138 of the chain upward, the guide structure 132 is caused to translate or slide downward relative to the linear bearing structure 150 such that the pieces of product 122 can be removed from the buffer.

In operation, the pieces of product 122 are moved by the input mechanism 124 to an input station. At the input station, the pieces of product 122 are fed into the pockets 131 defined between the paddles 130. The continuous chain 128 is driven by the first and second input gear mechanisms 154 and 156 such that the infed pieces of product 122 are conveyed over the top arcuate end piece 134 to an output station located adjacent to the output mechanism 126. At the output station, the pieces of product 122 are transferred either individually or in stacks to the output mechanism 126. If the input rate of the input mechanism 124 exceeds the output rate of the output mechanism 126, the input gear mechanism 154 drives the chain 128 upward faster than the output gear mechanism 156 drives the chain 128 downward. Such a drive rate variance between the input and output gear mechanisms 154 and 156 causes the entire guide structure 132 to translate upward such that the products 122 are accumulated in a buffer zone 166, as shown in FIGS. 2B and 2C. By contrast, pieces of product 122 are removed from the buffer zone 166 when the output gear mechanism 156 drives the chain 128 downward faster than the input gear mechanism 154 drives the chain 128 upward. Such a drive speed discrepancy causes the guide structure 132 to translate downward such that the products 122 can be removed from the buffer zone 166. If the buffer zone 166 becomes completely full and the input rate continues to exceed the output rate, the products 122 are conveyed downward to an overflow bin 168 that catches the excess pieces of product.

Referring back to FIGS. 2A–2C, the input station of the accumulating device 120 is located between the first and second input gears 158 and 160. The first and second input gears 158 and 160 are phased relative to one another such that the chain 128 is loosened at the input station between the input gears 158 and 160. A projection member 170 having a curved outer surface is located between the first and second input gears 158 and 160. The curved outer surface of the projection member 170 forces the loosened chain along a curved outward path. The curvature of the chain 128 caused by the projection member 170 causes the paddles 130 corresponding to the curved section of chain to spread or fan outward. The spread configuration of the paddles 130 at the input station facilitates entry of the pieces of product 122 into the pockets 131 defined between the paddles 130. Such a spread configuration is especially significant when handling products that are not uniform in shape or consistency.

It will be appreciated that the curvature of the chain 128 between the input gears 158 and 160 is greatly exaggerated in 2A–C for the purpose of illustration. Additionally, the curved outer surface of the projection member 170 preferably cooperates with a curved outer guide member that assists in maintaining contact between the chain 128 and the input gears 158 and 160. In use, the chain 128 travels along a curved path defined between the outer surface of the projection member 170 and the inner surface of the curved outer guide member.

Referring again to FIGS. 2A–2C, the output station of the accumulating device 120 is located between the first and second output gears 162 and 164. The first and second output gears 162 and 164 are phased relative to one another such that the chain 128 is tightened at the output region between the gears 162 and 164. By tightening the chain 128, the paddles 130 are retained at specific locations such that relatively precise spacing is maintained between the paddles 130. The relatively precise spacing generated by the tightened chain helps to prevent interference between the paddles 130 and any mechanisms that may be used to sweep or push the pieces of product 120 from the pockets 131.

FIGS. 3–6 illustrate an article-handling system 218 constructed in accordance with the principles of the present invention. For clarity, portions of the system shown in FIGS. 3–6 have been broken away or removed to improve the visibility of other portions of the system. The article-handling system 218 includes an accumulating device 220 having a configuration similar to the accumulating device 120 shown in FIGS. 2A–2C. The accumulating device 220 conveys products 222 between an input mechanism 224 and an output mechanism 226. The input mechanism 224 comprises an in-line conveyor that feeds products to an input station of the accumulating device. The output mechanism 226 comprises a 90° output pusher mechanism that removes pieces of product from the accumulating device at an output station. The output pusher mechanism includes a first solenoid-driven pusher 227 configured for pushing a stack of six products 22 laterally from the accumulating device 220. The output pusher also includes a second solenoid-driven pusher 229 that receives the stack of products from the first pusher 227 and pushes the stack to a downstream conveyor 233 arranged at a 90° angle with respect to the upstream conveyor of the input mechanism 224.

As previously specified, the accumulating device 220 has elements that are similar to those previously described with respect to the accumulating device 120 of FIGS. 2A–2C. For example, the accumulating device 220 includes a pair of continuous chains 228 including paddles 230 that define pockets 231 for receiving the products 222. Spacers 235 are positioned between the paddles 230 for maintaining uniform spacing between the paddles 230. The continuous chains 228 are mounted on a guide structure 232 having top and bottom arcuate end pieces 234 and 236 that are separated a fixed distance apart by a connecting member 237. The guide structure 232 is reciprocally connected to a frame 252 by a linear bearing structure that is slidably mounted on the connecting member 237.

Figure 3:
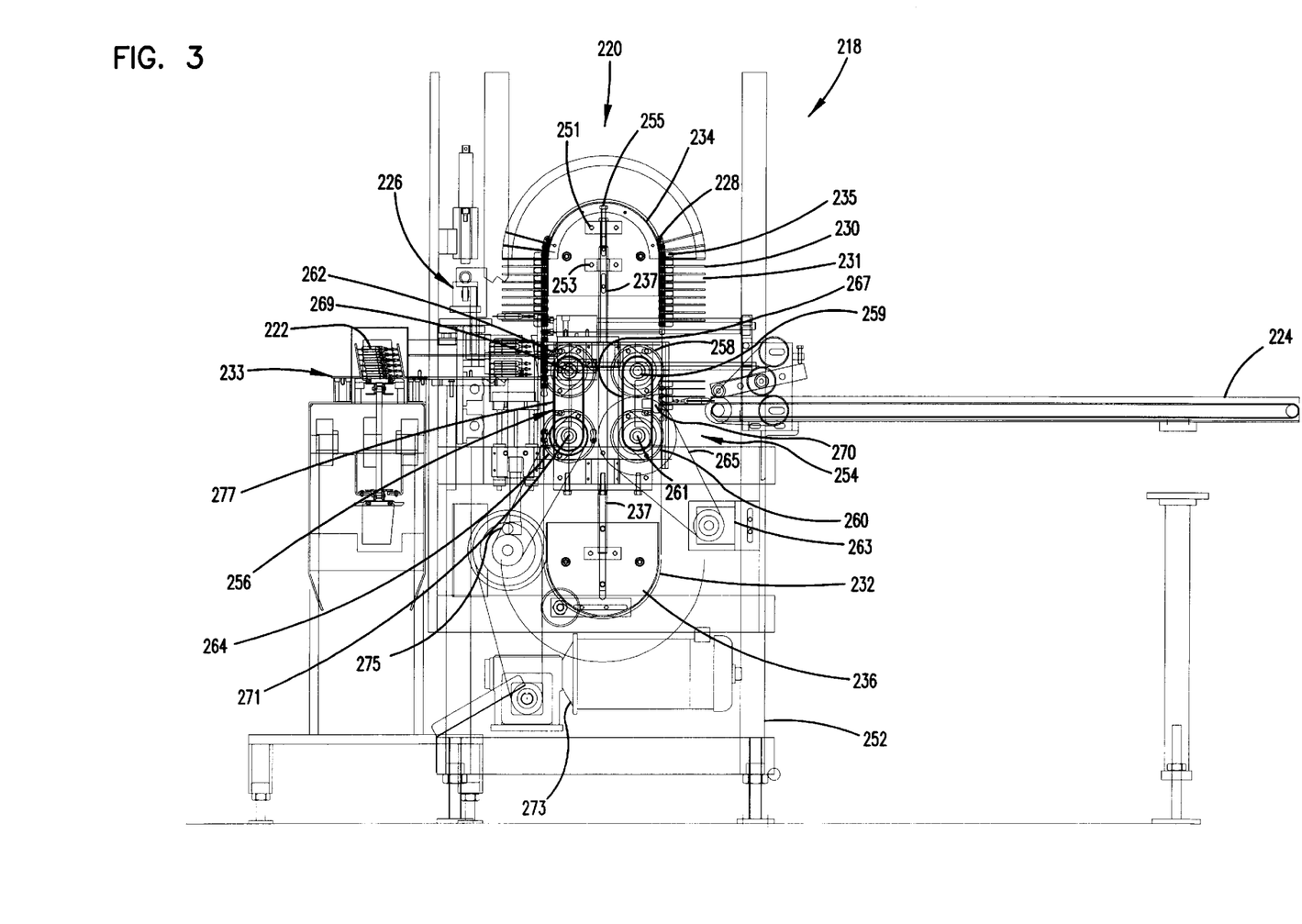
FIG. 3 is a front view of an article-handling system constructed in accordance with the principles of the present invention.
Figure 4:
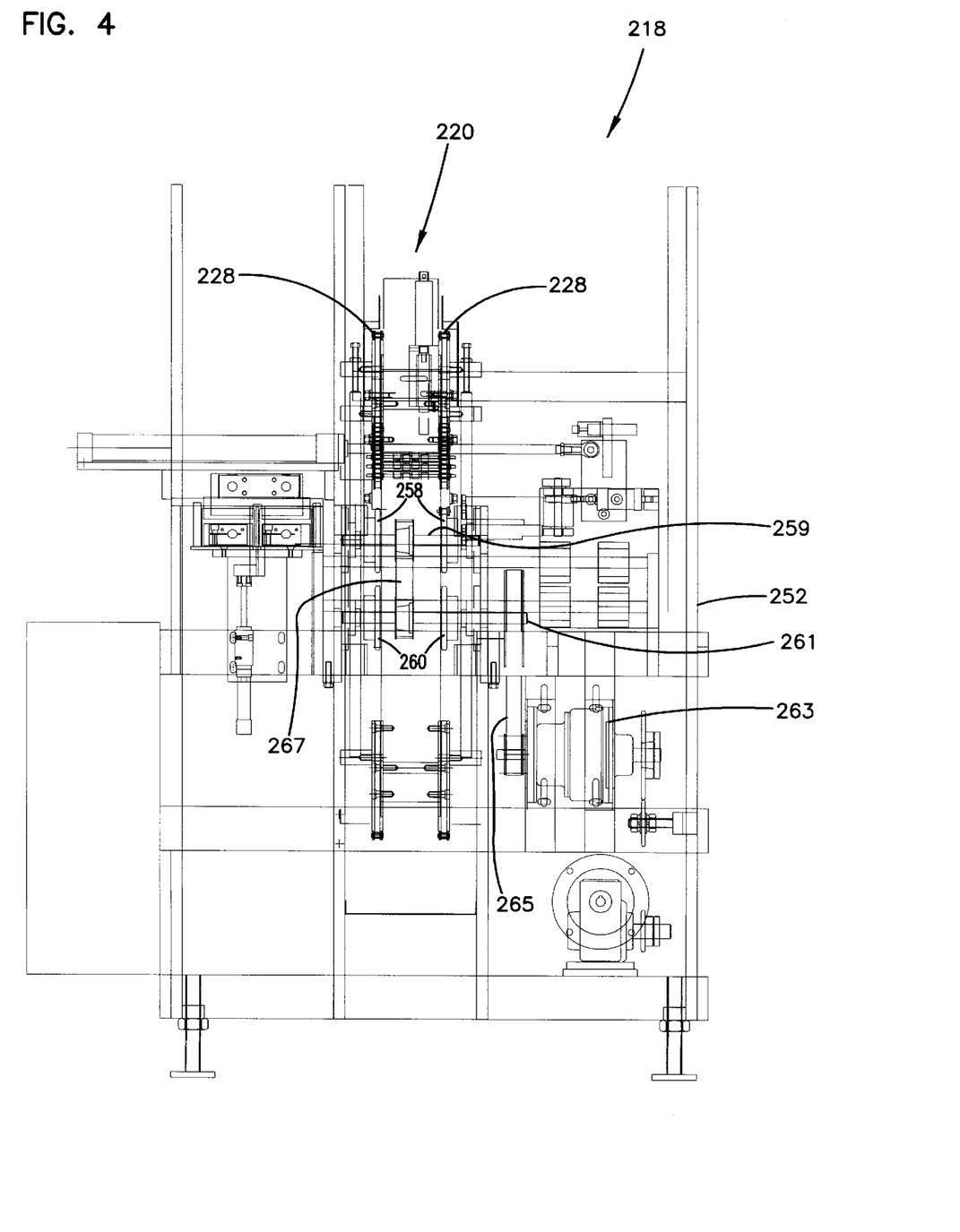
FIG. 4 is a right-side view of the article-handling system of FIG. 3.
Figure 5:
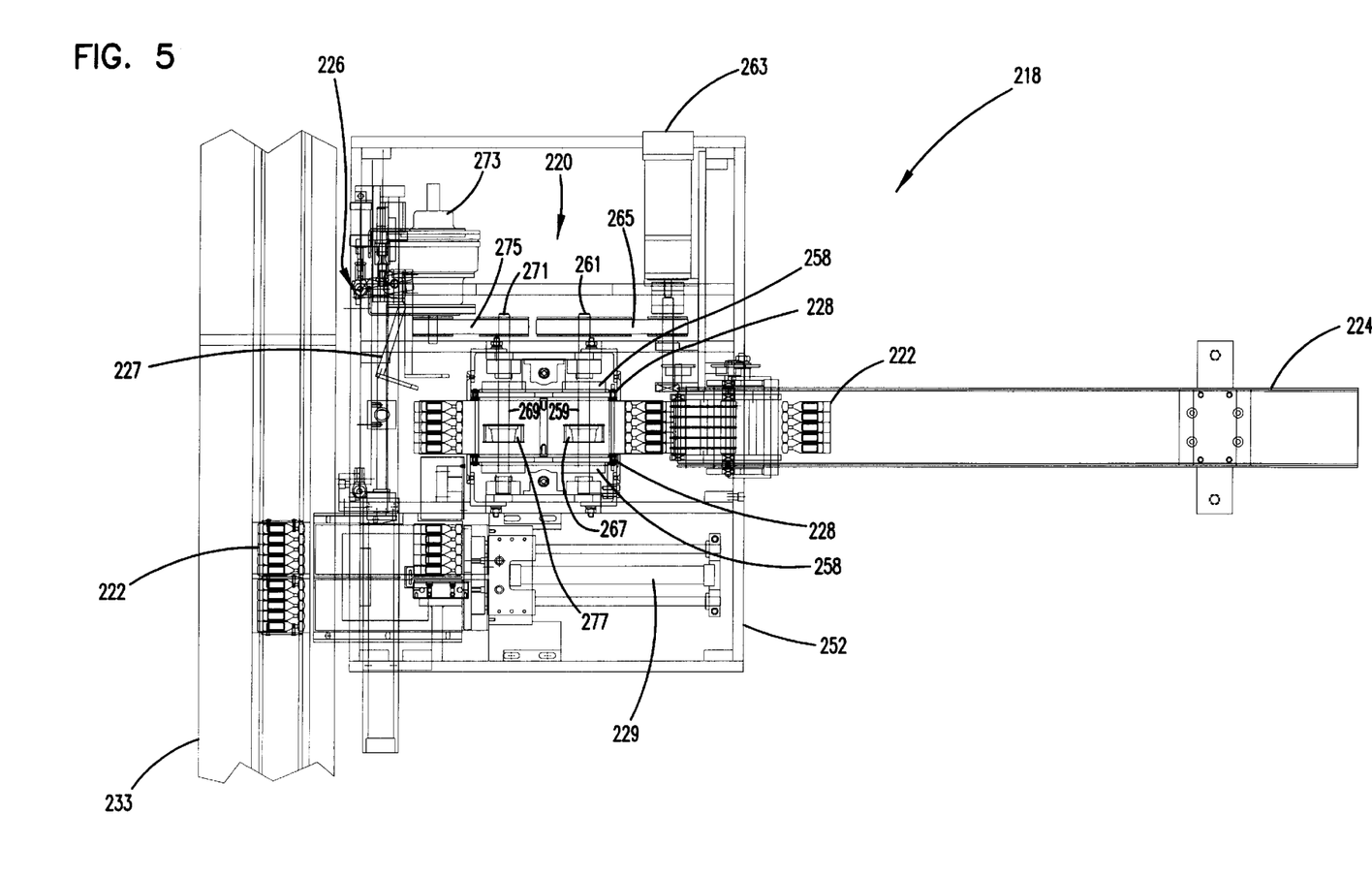
FIG. 5 is a top view of the article-handling system of FIG. 3.

The guide structure 232 is equipped with means for adjusting the spacing between the top and bottom arcuate end pieces 234 and 236. For example, as shown in FIG. 3, the means for adjusting spacing includes upper and lower mounting members 251 and 253 that are fastened to the top arcuate end piece 234. The lower mounting member 253 includes a bushing through which the connecting member 237 extends. The upper mounting member 251 includes a tapped hole in which a bolt 255 is threaded. By threading the bolt 255 in or out of the tapped hole in the upper mounting member 251, the distance between the top and bottom arcuate end pieces 234 and 236 can be adjusted.

The accumulating device 220 also includes an input gear mechanism 254 located at the upstream side of the accumulating device 220 and an output gear mechanism 256 located at the downstream side of the accumulating device 220. The input gear mechanism 254 includes two sets of first and second input gears 258 and 260 configured for driving the continuous chains 228 in an upward direction. The first input gears 258 are fixedly connected to one another by a first drive shaft 259 while the second input gears 260 are fixedly connected to one another by a second drive shaft 261. The sets of first and second input gears 258 and 260 preferably comprise adjustable or phased sprockets.

As shown in FIGS. 3–6, the sets of first and second input gears 258 and 260 are driven by a servo motor 263. Specifically, the servo motor 263 drives the second drive shaft 261 via a timing belt 265. Torque provided by the servo motor 263 is transferred between the first and second drive shafts 259 and 261 by a continuous chain 267 that interconnects the drive shafts 259 and 261 and causes the first and second input gears 258 and 260 to be rotated at the same rate.

The first and second input gears 258 and 260 are preferably phased relative to one another such that the continuous chains 228 are loosened at the input station located between the sets of first and second input gears 258 and 260. One exemplary technique for phasing one set of first and second input gears 258 and 260 is to hold the second input gear 260 of the set fixed, while rotating its corresponding first input gear 258 relative to the first drive shaft 259. The first input gear 258 is rotated in a direction relative to the first drive shaft 259 such that its corresponding chain 228 is loosened between the first and second input gears 258 and 260. As shown in FIG. 3, the first input gear 258 would be rotated in a clockwise direction to loosen the chain 228. Once a desired chain looseness has been established between the input gears 258 and 260, the first input gear 258 is fixed in position relative to the first drive shaft 259. After the first input gear 258 has been fixed relative to the first drive shaft 259, the first and second input gears 258 and 260 are held in the phased relationship relative to one another by the continuous chain 267 that interconnects the first and second drive shafts 259 and 261. Once the first set of gears 258 and 260 has been phased, the other set of gears 258 and 260 can be phased via the same technique. It will be appreciated that the above phasing technique is strictly exemplary, and that other techniques may also be utilized.

Referring back to FIG. 3, projection members 270 are positioned between the sets of first and second input gears 258 and 260. The projection members 270 function to force the loosened chains between the input gears 258 and 260 outward such that the paddles 230 are spread apart to facilitate inserting the products 222 in the pockets 231.

The output gear mechanism 256 of the accumulating device 220 includes sets of first and second output gears 262 and 264 configured for driving the chains 228 in a downward direction. The sets of first and second output gears 262 and 264 preferably comprise adjustable or phasable sprockets that are respectively mounted on third and fourth drive shafts 269 and 271. The output gear mechanism 256 is shown as powered by a clutch and brake motor 273. The clutch and brake motor 273 drives the fourth drive shaft 271 via a timing belt 275. Torque is transferred between the third and fourth drive shafts 269 and 271 via a continuous chain 277 that interconnects the third and fourth drive shafts 269 and 271 and functions to rotate the sets of first and second input gears 262 and 264 at the same rate. The chain 277 also functions to maintain a desired phased relationship between the sets of gears 262 and 264.

Preferably, the sets of first and second input gears 262 and 264 are phased relative to one another such that the chains 228 are tightened at the output station located between the first and second output gears 262 and 264. The phasing between the first and second output gears 262 and 264 can be set or adjusted in the same manner described with respect to the first and second input gears 258 and 260, except that the output gears 262 and 264 are relatively rotated such that the chain is tightened rather than loosened between the output gears 262 and 264.

A significant feature of the accumulating device 220 is the simplicity of the drive system. The accumulating device 220 includes two gear mechanisms, one for the input and one for the output. Depending upon the speed and precision required, the input or output gear mechanisms can be powered by relatively inexpensive brake motors and/or clutch and brake motors for low- and medium-speed applications, and servo systems for high-speed and precision applications. Additionally, stepper motors could also be used to power the gear mechanisms.

Figure 6:
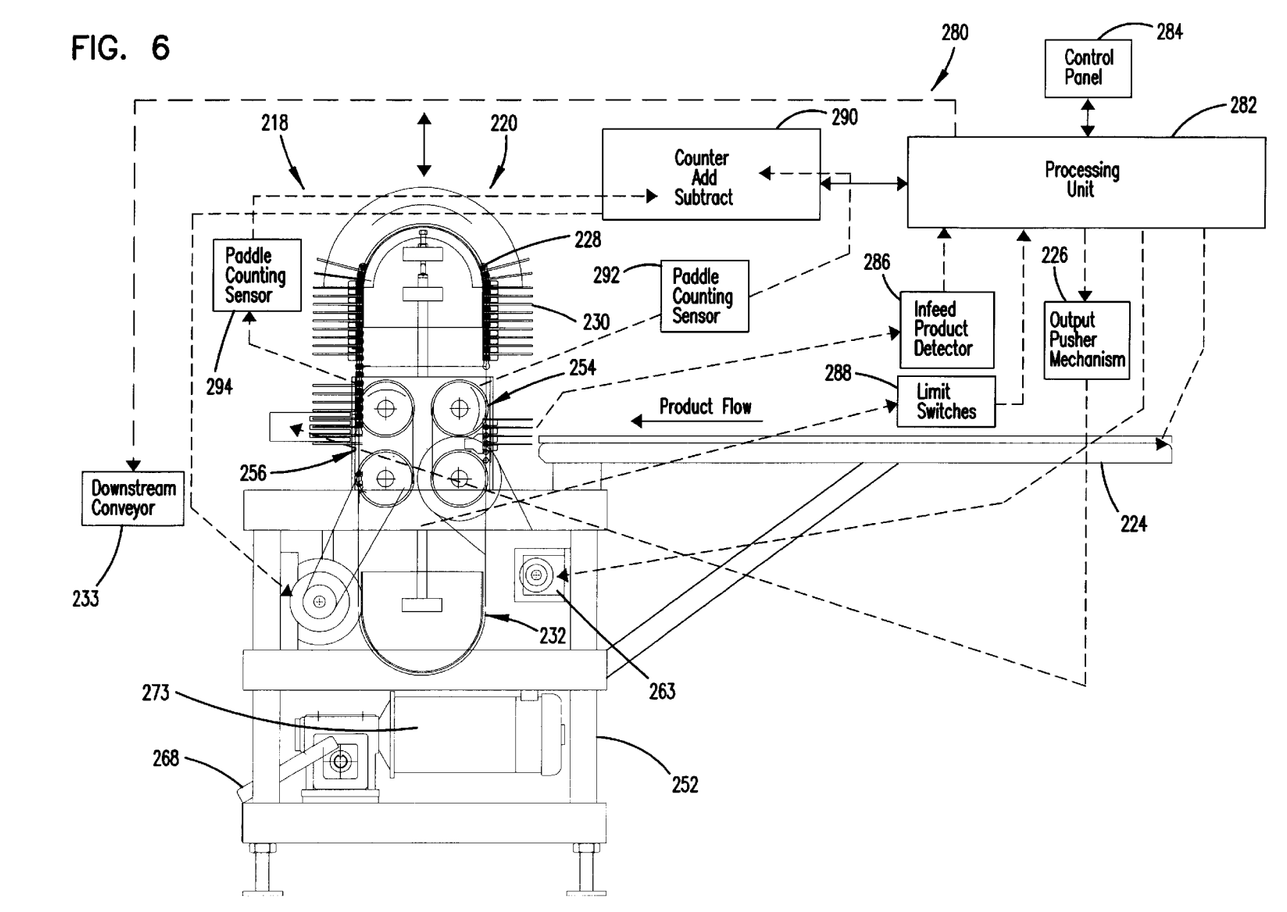
FIG. 6 is a control diagram for the system of FIG. 3.

FIG. 6 is a control system 280 for controlling the article handling system 218. The control system 280 includes a processing unit 282 that controls the input conveyor 224, the input servo motor 263, the output mechanism 226, the output clutch and brake motor 273, and the downstream conveyor 233. The processing unit 282 receives input from a control panel 284, an in-feed product detector 286 such as an electronic eye for detecting when products have been fed into the accumulating device 220, limit switches 288 for detecting when the guide structure 232 translates to a full-up or full-down position, and a counter 290. The counter 290 receives input from an up-paddle counting sensor 292 and a down-paddle counting sensor 294. Every time the in-feed paddles move up one position, the counter 290 adds one unit to the count. By contrast, every time the out-feed paddles move down one position, the counter 290 subtracts one unit from the count. The counter 290 is preferably programmed with a preset value that equals the number of products desired to be removed from the output station per cycle. For example, if it is desired to individually remove the products from the accumulating device at the output station, then the preset value equals one. However, if it is desired to remove a stack of n products from the accumulation device, then the preset value equals n.

In operation, the input and output gear mechanisms 254 and 256 work in tandem to selectively rotate the continuous chains 228 about the guide structure 232 (counterclockwise, as shown in FIG. 6), and translate the guide structure 232 upward or downward. In a sequence of normal operation, the input conveyor 224 feeds a piece of product into one of paddle pockets 231 that is located between the input gears 258 and 260 at the input station. Once the product is fed in the pocket 231, the input gear mechanism 254 moves the chains 228 up one position and the counter 290 adds one count. When the count on the counter 290 exceeds the preset value, and the downstream machine 233 is prepared to accept the product from the accumulating device 220, the output gear mechanism 256 will move the chains 228 downward a predetermined number of positions equal to the preset value, and the output pusher mechanism 226 will cycle pushing one stack height of the product out from between the paddles 230.

If the downstream machine 233 cannot accept the product while the input conveyor 224 continues to feed product into the upstream side of the accumulating device, the guide structure 232 will progressively be translated upward by the input gear mechanism 254 such that a buffer is generated. Each time the chains 228 are cycled downward by the output gear mechanism, the preset number of product pieces are cleared from the buffer. However, if the infeed rate of the input conveyor 224 continues to exceed the outfeed rate of the downstream conveyor 233, the guide structure 232 will eventually reach the full up position in which the buffer is full. When the buffer becomes full, the output gear mechanism 256 will move the chains 228 down the preset number of positions and the output pusher mechanism 226 will not be activated. Consequently, the product will be carried by the accumulating device 230 past the output station to an overflow bin. The overflow bin 268 provides additional time to allow an operator to shut down the upstream input conveyor 224 until the downstream machine 233 can be prepared to accept additional product. In this manner, the overflow bin 268 helps to prevent jamming of the accumulating device 220 in overflow situations.

Figure 7A:
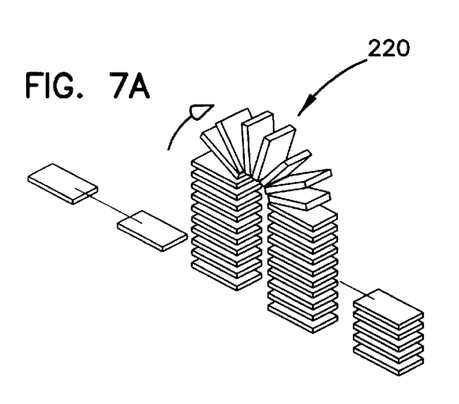
FIGS. 7A–D illustrate four different load and unload options that are possible via the system of FIG. 3.
Figure 7B:
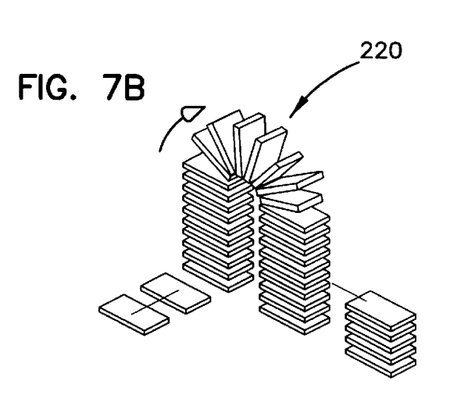
Figure 7C:
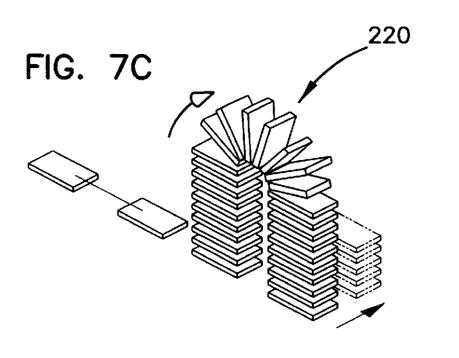
Figure 7D:
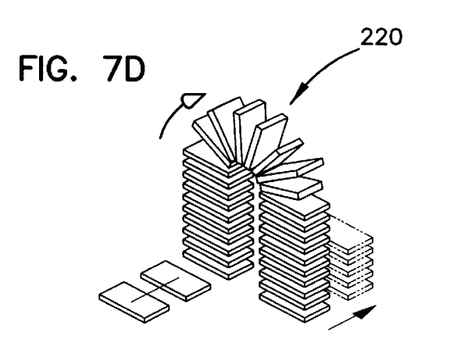

FIGS. 7A–7D illustrate four alternative load and unload options that can be utilized with the accumulating device 220. FIG. 7A shows the accumulating device 220 with an in-line input and an in-line output. FIG. 7B shows the accumulating device 220 with a 90° input and an in-line output. FIG. 7C shows the accumulating device with an in-line input and a 90° output. FIG. 7D shows the accumulating device 220 with a 90° input and a 90° output.

Throughout the specification accumulating devices are described as being located between input/infeed mechanisms and output/outfeed mechanisms. In this regard, it will be appreciated that it is preferred for accumulators in accordance with the principles of the present invention to be manufactured and sold in combination with the input/infeed mechanisms and the output/outfeed mechanisms. For example, it is preferred to manufacture single units or machines equipped with an accumulator and corresponding input/infeed mechanisms and output/outfeed mechanisms. Preferably, the control system of the accumulator is designed to particularly operate with the specific corresponding input/infeed mechanisms and output/outfeed mechanisms.

With regard to the foregoing description, it is to be understood that changes may be made in detail, especially in matters of the construction materials employed and the shape, size, and arrangement of the parts without departing from the scope of the present invention. It is intended that the specification and depicted aspects be considered exemplary only, with a true scope and spirit of the invention being indicated by the broad meaning of the following claims.

What is claimed is:

1. An accumulating device for providing a buffer between two article-handling devices, the accumulating device comprising:

a frame;

a guide structure reciprocally moveable in opposite first and second directions with respect to the frame;

a continuous member mounted on the guide structure for conveying pieces of product between the article-handling devices;

a plurality of drive members constructed and arranged to both rotate the continuous member about the guide structure and reciprocate the guide structure in the first and second directions relative to the frame, wherein the buffer is generated when the guide structure is moved in the first direction, and the buffer is cleared when the guide structure is moved in the second direction;

the plurality of drive members including a pair of input drive members;

the continuous member including a plurality of spaced-apart paddles defining pockets arranged and configured to receive the pieces of product at an infeed position located between the pair of input drive members; and the input drive members being phased relative to one another such that the continuous member is loosened at the infeed position, wherein the loosened continuous member allows the paddles to spread apart to enlarge the pockets for receiving the pieces of product from the input device.

2. The accumulating device of claim 1, wherein the guide structure includes a first end piece spaced from a second end piece, and a connecting member extending between the end pieces for maintaining a fixed distance between the end pieces.

3. The accumulating device of claim 2, wherein the fixed distance is adjustable.

4. The accumulating device of claim 2, wherein the connecting member is connected to the frame by a slide bearing, the slide bearing being arranged to allow the connecting member to slide within the bearing such that the guide structure is reciprocally moveable relative to the frame.

5. The accumulating device of claim 4, wherein the continuous member is looped around the end pieces and includes first and second substantially parallel portions extending between the end pieces.

6. The accumulating device of claim 5, wherein the connecting member is aligned in a substantially vertical orientation such that the guide structure is reciprocally moved up and down.

7. The accumulating device of claim 5, wherein the connecting member is substantially parallel to the parallel portions of the continuous member.

8. The accumulating device of claim 2, wherein the end pieces comprise arcuate tracks for guiding the continuous member.

9. The accumulating device of claim 8, wherein the tracks are made of plastic.

10. The accumulating device of claim 1, wherein the guide structure defines a continuous member path having a geometry that remains substantially constant as the guide structure is reciprocated.

11. The accumulating device of claim 10, wherein the geometry of the continuous member path is generally oval-shaped.

12. The accumulating device of claim 7, wherein the drive members include a first drive member engaging the first substantially parallel portion of the continuous member and a second drive member engaging the second substantially parallel portion of the continuous member.

13. The accumulating device of claim 1, wherein the continuous member comprises a continuous chain, and the input drive members comprise gears.

14. The accumulating device of claim 1, further comprising a projection member located between the input drive members for forcing the continuous member outward such that the paddles are spread apart to enlarge the pockets at the infeed position.

15. The accumulating device of claim 14, wherein the plurality of drive members also includes a pair of spaced apart output drive members.

16. The accumulating device of claim 15, wherein an outfeed position for removing the pieces of product from the paddles is located between the pair of output drive members.

17. The accumulating device of claim 16, wherein the output drive members are phased to tighten the continuous member at the outfeed position.

18. A product handling apparatus comprising:

a continuous member;

a plurality of paddles connected to the continuous member, the paddles defining pockets for receiving pieces of product;

first and second drive members constructed and arranged to propel the continuous member, the first and second drive members being phased relative to one another such that a loosened portion of the continuous member is formed between the first and second drive members to facilitate fanning apart the paddles; and an infeed station located between the first and second drive members for feeding the pieces of product between the paddles.

19. The product handling apparatus of claim 18, further comprising a projection member positioned between the first and second drive members, the projection member being arranged and configured to engage the loosened portion of the continuous member such that at least some of the paddles located at the loosened portion of the continuous member are caused to fan apart.

20. The product handling apparatus of claim 19, wherein the continuous member comprises a continuous chain, and the first and second drive members comprise drive gears.

21. A product handling apparatus comprising:

a continuous member;

a plurality of paddles connected to the continuous member, the paddles defining pockets for receiving pieces of product;

first and second drive members constructed and arranged to propel the continuous member, the first and second drive members being phased relative to one another such that a tightened portion of the continuous member is formed between the first and second drive members; and an outfeed station located between the first and second drive members for removing the pieces of product that are held between the paddles.

22. The product handling apparatus of claim 21, wherein the continuous member comprises a continuous chain, and the first and second drive members comprise drive gears.

23. An accumulating device for providing a buffer between two article—handling devices, the accumulating device comprising:

a frame;

a guide structure reciprocally moveable in opposite first and second directions with respect to the frame;

a continuous member mounted on the guide structure, the continuous member including a plurality of paddles for conveying pieces of product between the article—handling devices;

a plurality of drive members constructed and arranged to both rotate the continuous member about the guide structure and reciprocate the guide structure in the first and second directions relative to the frame, wherein the buffer is generated when the guide structure is moved in the first direction, and the buffer is cleared when the guide structure is moved in the second direction;

the drive members including a pair of spaced apart output drive members between which an outfeed station for feeding the pieces of product from the paddles to the output device is located; and the output drive members being phased to tighten the continuous member at the outfeed station.

24. The accumulating device of claim 23, wherein the output drive members comprise output gears, and the continuous member comprises a continuous chain.

* * * * *

UNITED STATES PATENT AND TRADEMARK OFFICE
CERTIFICATE OF CORRECTION

PATENT NO. : 5,960,927
DATED : October 5, 1999
INVENTOR(S) : Bahr

It is certified that error appears in the above-identified patent and that said Letters Patent is hereby corrected as shown below:

Column 7,
Line 6, "22" should read -- 222 --.

Signed and Sealed this

Twenty-second Day of January, 2002

Attest:

Attesting Officer

JAMES E. ROGAN
Director of the United States Patent and Trademark Office